(12) United States Patent
Suzuki

(10) Patent No.: US 9,074,528 B2
(45) Date of Patent: Jul. 7, 2015

(54) BI-FUEL ENGINE FOR VEHICLE

(71) Applicant: SUZUKI MOTOR CORPORATION, Shizuoka (JP)

(72) Inventor: Katsunori Suzuki, Shizuoka (JP)

(73) Assignee: SUZUKI MOTOR CORPORATION, Shizuoka (JP)

( * ) Notice: Subject to any disclaimer, the term of this patent is extended or adjusted under 35 U.S.C. 154(b) by 422 days.

(21) Appl. No.: 13/659,274

(22) Filed: Oct. 24, 2012

(65) Prior Publication Data
US 2013/0125863 A1 May 23, 2013

(30) Foreign Application Priority Data

Nov. 17, 2011 (JP) ................................. 2011-251707

(51) Int. Cl.
| F02D 19/06 | (2006.01) |
| F02M 61/14 | (2006.01) |
| F02M 35/10 | (2006.01) |
| F02M 35/112 | (2006.01) |
| F02M 35/116 | (2006.01) |
| F02M 21/02 | (2006.01) |
| F02M 35/04 | (2006.01) |
| F02M 55/00 | (2006.01) |
| F02B 69/04 | (2006.01) |

(52) U.S. Cl.
CPC ............... *F02B 69/04* (2013.01); *F02M 61/14* (2013.01); *F02M 35/10216* (2013.01); *F02M 35/112* (2013.01); *F02M 35/116* (2013.01); *F02M 21/02* (2013.01); *F02M 35/044* (2013.01); *F02M 35/048* (2013.01); *F02M 35/10111* (2013.01); *Y02T 10/32* (2013.01)

(58) Field of Classification Search
CPC ..... F02M 21/02; F02M 61/14; F02M 35/122; F02M 35/116; F02M 35/10216; F02M 35/10111; F02B 69/04
See application file for complete search history.

(56) References Cited

U.S. PATENT DOCUMENTS 4,993,375 A * 2/1991 Akihiko .................... 123/90.38
5,036,805 A * 8/1991 Yamamoto et al. .......... 123/579
(Continued)

FOREIGN PATENT DOCUMENTS

| CN | 101142401 A | 3/2008 | |
| CN | 101858289 A | 10/2010 | |
| JP | 2004183538 A * | 7/2004 | ............. F02M 69/04 |

(Continued)

OTHER PUBLICATIONS

Office Action mailed Aug. 1, 2013 in corresponding DE Application No. 10 2012 220 308.7 (10 pages).
(Continued)

*Primary Examiner* — Hieu T Vo
(74) *Attorney, Agent, or Firm* — Rothwell, Figg, Ernst & Manbeck, P.C.

(57) ABSTRACT

A bi-fuel engine is equipped with an engine body, a plurality of branched intake pipes, a surge tank, and an air cleaner. Each of the branched intake pipes has a length including a slant portion and a bend. The bend is located on the side of the engine body and connects at an end to the slant portion and at the other end to a downstream end of the branched intake pipe. The slant portion extends from the bend to the upstream end of the branched intake pipe obliquely to a horizontal direction of the engine body so as to define between the surge tank and an upper portion of the engine body a space which is large enough to permit a cylinder head cover to be installed to and uninstalled from the upper portion of the engine body.

6 Claims, 4 Drawing Sheets

(56) References Cited

U.S. PATENT DOCUMENTS

2006/0207527 A1 9/2006 Saeki et al.
2010/0251993 A1 10/2010 Sugiyama

FOREIGN PATENT DOCUMENTS

| JP | 2010-242559 A | 10/2010 |
|---|---|---|
| WO | 2010/066183 A1 | 6/2010 |

OTHER PUBLICATIONS

Office Action mailed Aug. 1, 2014 in corresponding Chinese Patent Application No. 201210462321.4 (with an English translation) (13 pages).

Notice of Allowance mailed Mar. 20, 2015 in corresponding Chinese Patent Application No. 201210462321.4 (2 pages).

\* cited by examiner

UPPER
FRONT ← → REAR

BI-FUEL ENGINE FOR VEHICLE

CROSS REFERENCE TO RELATED DOCUMENT

The present application claims the benefit of priority of Japanese Patent Application No. 2011-251707 filed on Nov. 17, 2011, the disclosure of which is totally incorporated herein by reference.

BACKGROUND OF THE INVENTION

1. Technical Field of the Invention

The present invention relates generally to a bi-fuel engine for vehicles which runs on two types of fuel: one is liquid fuel, and the other is gas fuel.

2. Background Art

Bi-fuel engines designed to run on two types of fuel: one being liquid fuel such as gasoline, and the other being gas fuel such as compressed natural gas (CNG), are known as internal combustion engine for automotive vehicles. A typical one of such bi-fuel engines is equipped with a gas fuel injection device disposed on a cylinder head cover mounted on the top of an engine body and gas fuel hoses connecting gas fuel injectors of the gas fuel injection device and an intake manifold together. The gas fuel hoses extend beneath a liquid fuel injection device.

For example, Japanese Patent First Publication No. 2010-242559 teaches such a type of bi-fuel engine.

The above structure in which the gas fuel injection device and the gas fuel hoses are arranged on the top of the cylinder head cover, however, faces drawbacks, as discussed below. The removal of the cylinder head cover from the engine body requires steps of dismounting the liquid fuel injection device, disconnecting the intake manifold from the gas fuel injection device, uninstalling the gas fuel injection device, and disconnecting the gas fuel pipes from the intake manifold. The assembly or disassembly of the engine is, therefore, quite inconvenient.

Additionally, the gas fuel injection device is located close to the intake manifold. The total length of the gas fuel hoses connecting between the gas fuel injection device and the intake manifold is, therefore, short. It is, thus, difficult to bend the gas fuel hoses to lay out and joint them to the engine.

Moreover, the gas fuel injection device is mounted over the top of the cylinder head cover, so that it greatly protrudes outside the cylinder head cover. The exertion of external force on the vehicle may, thus, result in physical interference of the gas fuel injection device with peripheral devices.

Further, when an air cleaner is disposed above the engine, it may interfere with the gas fuel injection device which projects greatly from the cylinder head cover. The air cleaner is, thus, subjected to the restriction on volume thereof.

SUMMARY OF THE INVENTION

It is therefore an object of the invention to provide a bi-fuel engine for vehicles which is designed to ensure an increased volume of an air cleaner, be easy to assemble, and/or protect a gas fuel injection device from an external force applied to the vehicle.

According to one aspect of the invention, there is provided a bi-fuel engine which is to be mounted in a vehicle such as an automobile. The bi-fuel engine comprises: (a) an engine body which has a cylinder head cover disposed detachably on an upper portion thereof; (b) a plurality of branched intake pipes joined at downstream ends thereof to a side of the engine body in communication with an intake path in the engine body; (c) a surge tank to which an upstream end of each of the branched intake pipes is coupled; (d) an air cleaner which communicates with the surge tank; (e) a liquid fuel injection device which works to inject a liquid fuel into the engine body; (f) a plurality of gas fuel hoses each of which is joined at a first end thereof to a portion of one of the branched intake pipes which is located near the downstream end; and (g) a gas fuel injection device equipped with a plurality of gas fuel injectors each of which connects with a second end of one of the gas fuel hoses.

Each of the branched intake pipes has a length including a slant portion and a bend. The bend is located laterally to the engine body and has a first end leading to the slant portion and a second end leading to the downstream end of the branched intake pipe. The slant portion extends from the first end of the bend to the upstream end of the branched intake pipe at a given angle to a horizontal direction of the engine body so as to create between the surge tank and the upper portion of the engine body a space which is large enough to permit the cylinder head cover to be installed to and uninstalled from the upper portion of the engine body.

In the preferred mode of the embodiment, the air cleaner is disposed above the slant portions of the branched intake pipes. The gas fuel injection device is disposed in a clearance between the surge tank and the air cleaner. The gas fuel injectors are located near the upstream ends of the branched intake pipes. The gas fuel hoses extend along the branched intake pipes, respectively. The liquid fuel injection device is disposed in a space defined between the engine body and the branched intake pipes.

Each of the gas fuel injectors is so inclined at a given angle to the horizontal direction of the engine body as to have a head to which one of the gas fuel hoses is joined and which faces the bend of one of the branched intake pipes.

The gas fuel injectors and the gas fuel hoses are disposed alternately in a direction in which the branched intake pipes are arrayed.

The gas fuel injection device and the air cleaner are secured to the surge tank.

The engine body is so designed as to be mounted in a vehicle with the branched intake pipes facing a rear of the vehicle.

The above described structure improves the ease of assembly of the bi-fuel engine, permits the air cleaner to have an increased volume, and serves to protect the gas fuel injection device physically when an external force is applied to the bi-fuel engine.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but is for the purpose of explanation and understanding only.

In the drawings.

DESCRIPTION OF THE PREFERRED EMBODIMENT

Figure 1:
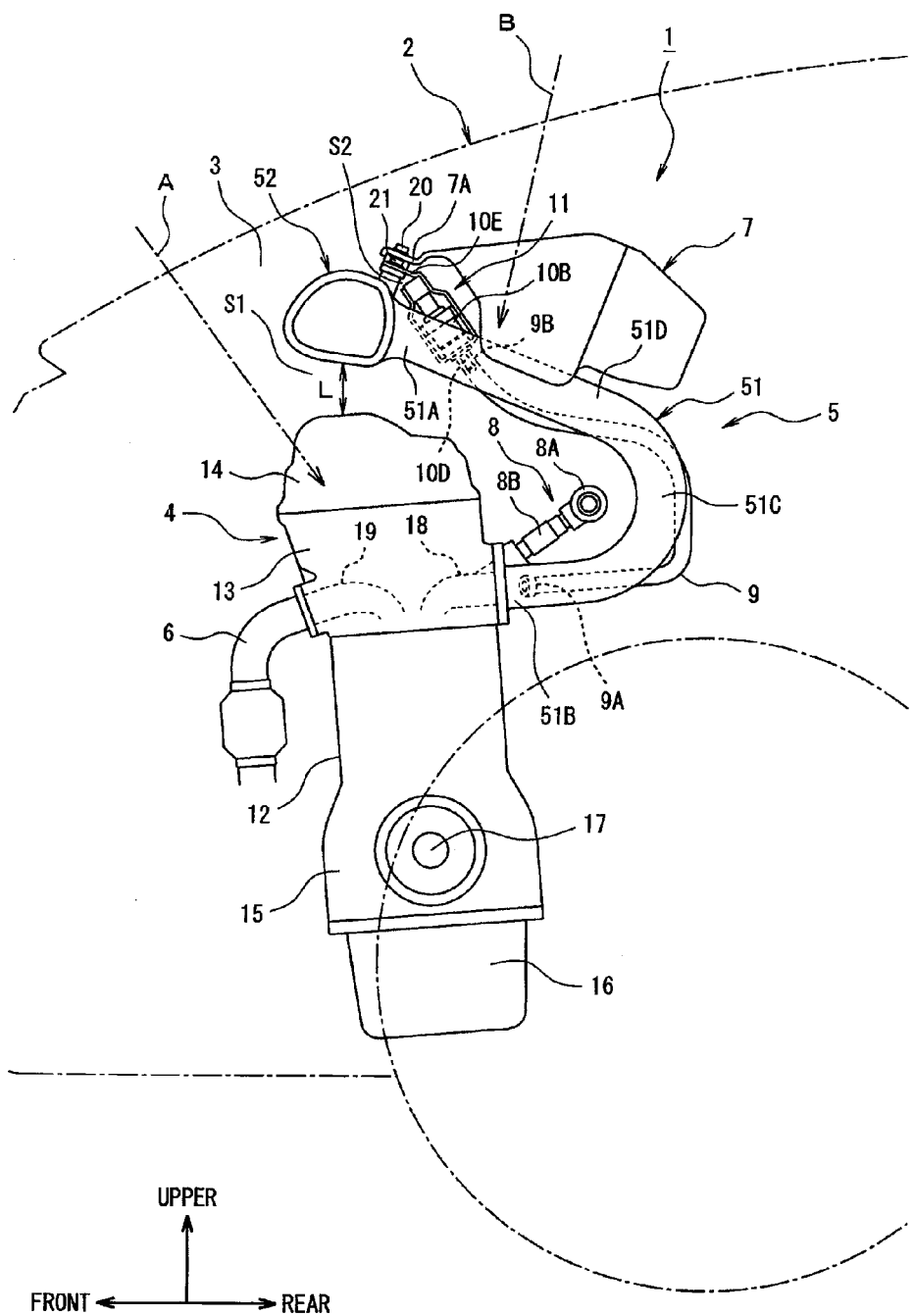
FIG. 1 is a side view which illustrates a bi-fuel engine according to an embodiment of the invention.

Referring to the drawings, wherein like reference numbers refer to like parts in several views, particularly to FIG. 1, there is shown a bi-fuel engine 1 according to an embodiment of the invention. Note that each view schematically illustrates parts of the bi-fuel engine 1 regardless of their true sizes or ratios among them for the sake of simplicity of illustration.

Outline Structure of Engine

The bi-fuel engine 1 is, as clearly illustrated in FIG. 1, mounted within an engine compartment 3 formed in the front 2 of an automotive vehicle. The bi-fuel engine 1 consists essentially of an engine body 4, an intake manifold 5, an exhaust manifold 6, an air cleaner 7, a liquid fuel injection device 8, a plurality of gas fuel hoses (i.e., hollow tubes) 9, and a gas fuel injection device 11. The gas fuel injection device 11 is equipped with a plurality of gas fuel injectors 10B.

Engine Body

The engine body 4 includes a cylinder block 12, a cylinder head 13 mounted on the cylinder block 12, a cylinder head cover 14 disposed on the cylinder head 13, a lower crankcase 15 formed below the cylinder block 12, and an oil pan 16 (also called a sump) arranged below the lower crankcase 15.

The lower crankcase 15 supports or bears a crankshaft 17 rotatably. The cylinder block 12 has formed therein a plurality of cylinders (not shown) within which pistons (not shown) reciprocate vertically. The vertical reciprocating motion of each piston is transmitted and converted into rotational motion of the crankshaft 17.

The cylinder head 13 has formed therein a plurality of intake paths 18 through which air is brought into the cylinders of the cylinder block 12 The cylinder head 13 also has formed therein a plurality of exhaust paths 19 through which exhaust gas is discharged from the cylinders. Additionally, the cylinder head 13 has intake valves and exhaust valves (not shown) mounted above the cylinders to open or close the intake and exhaust paths 18 and 19.

A valve train (not shown) is mounted on the top of the cylinder head 13. The valve train works to control the operation of the intake and exhaust valves at a given timing. The cylinder head cover 14 is secured to the top of the cylinder head 13 detachably using a fastening mechanism such as bolts. The maintenance such as repair or adjustment of the valve train and other parts is usually achieved by removing the cylinder head cover 14 from the cylinder head 13.

Intake Manifold

The intake manifold 5, as illustrated in FIG. 1, consists of a plurality of branched intake pipes 51 and a surge tank 52. The surge tank 52 is laid above the cylinder head cover 14 at a distance L away therefrom. The distance L is a vertical interval between a lower surface of the surge tank 52 and an upper surface of the cylinder head cover 14 and so selected as to permit the cylinder head cover 14 to be removed from or installed to the cylinder head 13 without any physical interference with the surge tank 52. In other words, the distance L is so determined as to create between the surge tank 52 and the cylinder head cover 14 (i.e., an upper portion of the engine body 4) a working space S1 which has a volume large enough to enable, for example, an assembly worker to dismount the cylinder head cover 14 from the cylinder head 13 without any physical interference with the surge tank 52. The distance L may be defined along a line extending vertically from the center of a traverse section of the surge tank 52.

The removal of the cylinder head cover 14, as can be seen from FIG. 1, enables the valve train (including, for example, a camshaft) mounted on the cylinder head 13 to be visually perceived or refurbished or maintained from a direction, as indicated by an arrow A.

Figure 2:
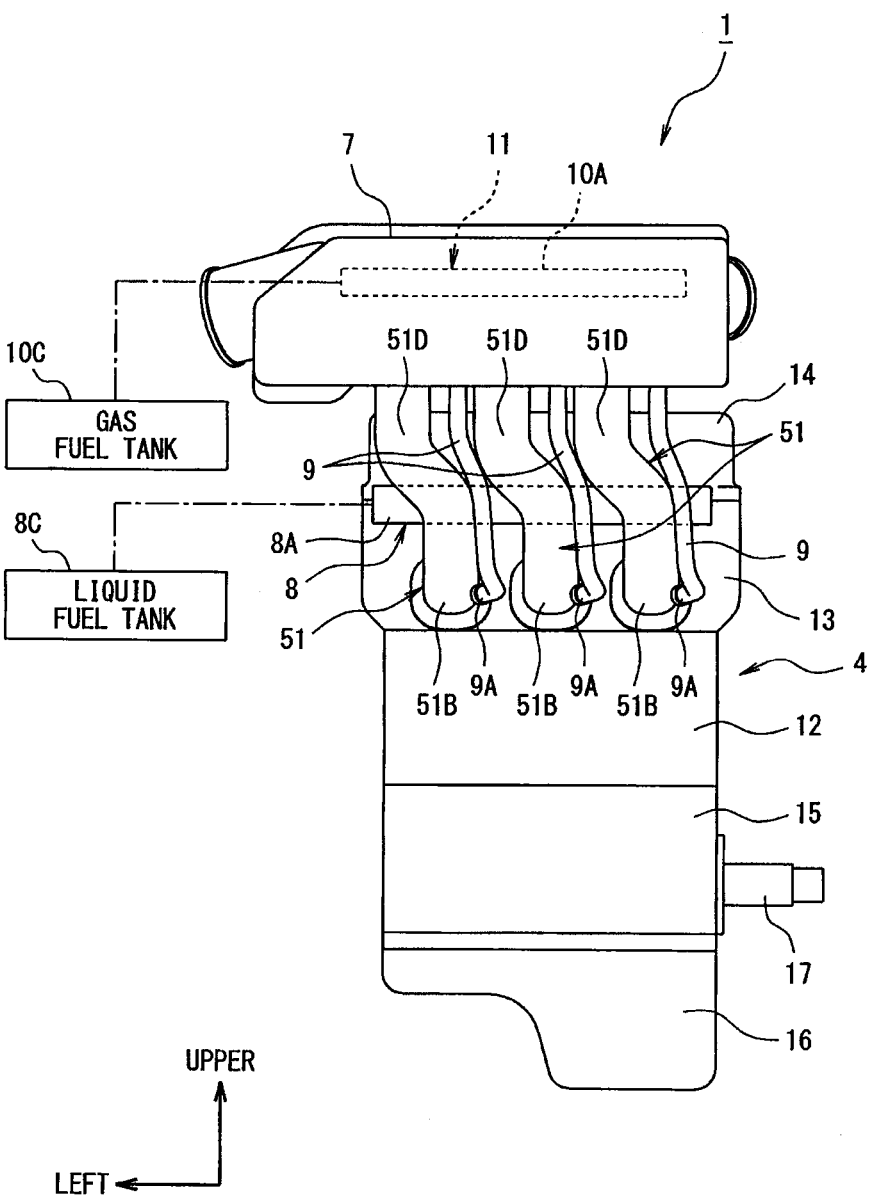
FIG. 2 is a back view which illustrates a rear side of the bi-fuel engine of FIG. 1.
Figure 4:
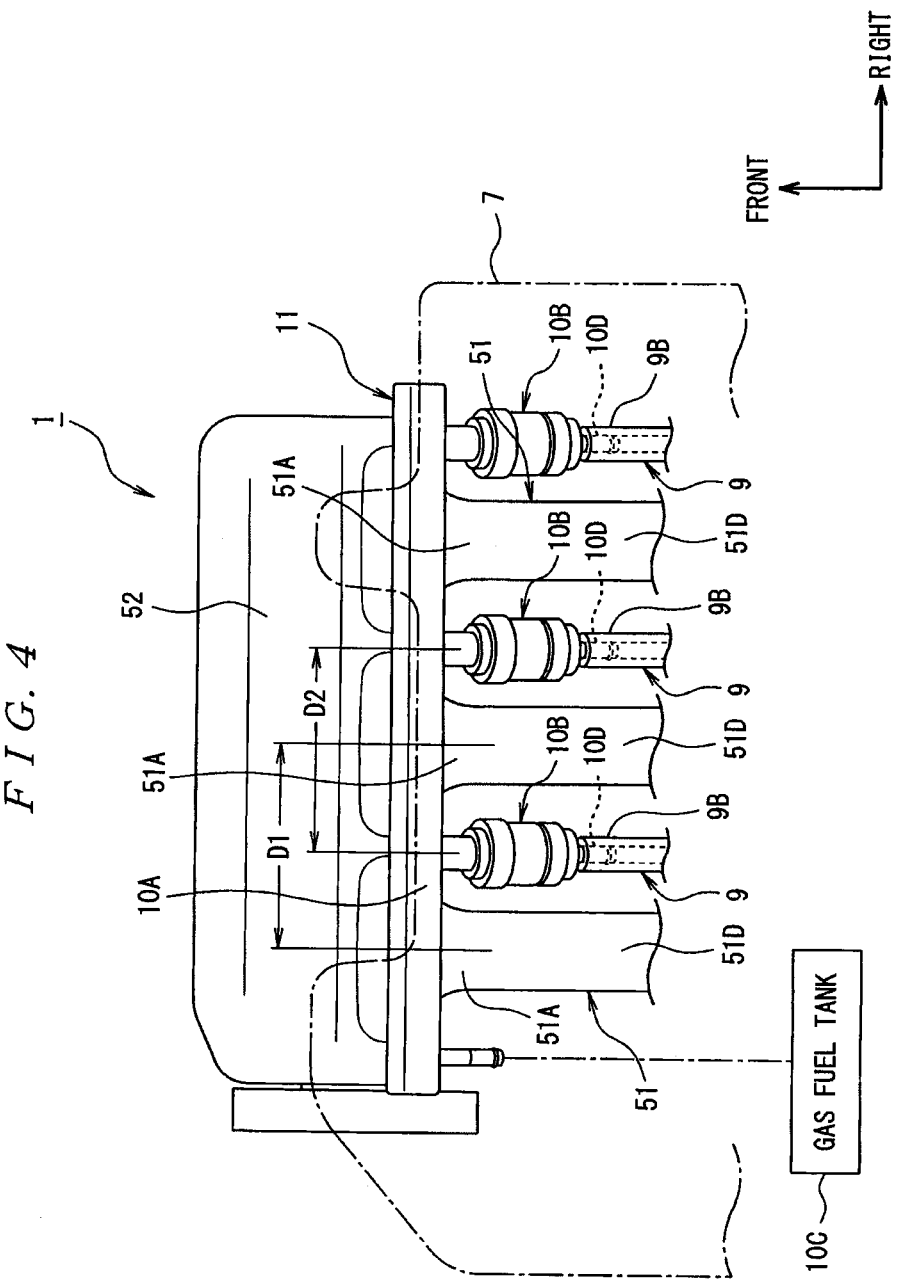
FIG. 4 is a partial plan view which illustrates highlights of the bi-fuel engine of FIG. 1.

The branched intake pipes 51, as clearly illustrated in FIG. 4, communicate at upstream ends 51A thereof with outlets of the surge tank 52. The branched intake pipes 51 extend vertically, as viewed from the drawing, and are arrayed at a given interval D1 away from each other in a lengthwise direction of the surge tank 52 (i.e., a lateral direction in the drawing). The interval D1 is a distance between longitudinal center lines of adjacent two of the branched intake pipes 51. The branched intake pipes 51, as can be seen in FIGS. 1 and 2, also connect at downstream ends 51B thereof to inlets which are formed in a side wall of the cylinder head 13 and communicate with the intake paths 18, respectively. In this embodiment, the branched intake pipes 51 of the intake manifold 5 are so disposed as to extend from the engine body 4 backward in the engine compartment 3.

Each of the branched intake pipes 51 has a given length made up of an upstream portion, a downstream portion, and a middle portion. The middle portion is curved (which will also be referred to as a bend 51C below) and located closer to the downstream end 51B than to the upstream end 51A. The bend 51C of each of the branched intake pipes 51 is located laterally to the engine body 4 (i.e., the engine head 13 and the cylinder head cover 14) and made to direct the branched intake pipe 51, as extending horizontally (i.e., the longitudinal direction of the vehicle) from the side wall of the cylinder head 13, obliquely upward to the surge tank 52. In other words, the bend 51C is so formed as to define a substantially U-shape of the branched intake pipe 51 and connect the downstream portion and the upstream portion of the branched intake pipe 51 together. The downstream portion extends substantially horizontally (i.e., backward of the vehicle) from the inlet in the side wall of the cylinder head 13. The upstream portion extends from behind the cylinder head 13 obliquely forward to the outlet of the surge tank 52. The upstream portion of the branched intake pipe 51 is a slant portion 51D, as illustrated in FIG. 1, extending from the upstream end 51A obliquely downward in the backward direction of the vehicle. In other words, the slant portion 51D extends at a given angle (greater than zero) to the horizontal direction of the engine body 4 so as to create the working space S1 between the surge tank 52 and the upper portion of the engine body 4.

As apparent from the above discussion, each of the branched intake pipes 51 does not extend straight from the side of the cylinder head 13 to the surge tank 52, but bypasses the side of the cylinder head 13. The exhaust manifold 6 is, as clearly illustrated in FIGS. 1 and 3, joined to the front side of the cylinder head 13 which is opposed to the rear side to which the intake manifold 5 is joined.

Liquid Fuel Injection Device

The liquid fuel injection device 8 is, as illustrated in FIGS. 1 and 2, disposed among an array of the branched intake pipes 51, the cylinder head 13, and the cylinder head cover 14. The liquid fuel injection device 8 includes a liquid fuel delivery pipe 8A and a plurality of liquid fuel injectors 8B which are joined to the liquid fuel delivery pipe 8A and arrayed at a given interval away from each other.

The liquid fuel delivery pipe 8A extends in a direction in which the branched intake pipes 51 are arrayed, that is, in the lateral direction (i.e., the widthwise direction) of the vehicle when the bi-fuel engine 1 is mounted in the engine compartment 3. Each of the liquid fuel injectors 8B is mounted in the wall of the cylinder head 13 and works to spray liquid fuel such as gasoline into a corresponding one of the intake paths 18.

The liquid fuel delivery pipe 8A of the liquid fuel injection device 8 is, as can be seen in FIG. 2, joined to a liquid fuel tank 8C in which the liquid fuel is stored. When a controller such as an engine electronic control unit installed in the vehicle enters a liquid fuel injection mode, it outputs a control signal to each of the liquid fuel injectors 8B to spray the liquid fuel, as delivered from the liquid fuel tank 8C, into the combustion chambers of the bi-fuel engine 1.

As is clear from the above discussion, the liquid fuel injection device 8 is disposed in a chamber defined by the array of branched intake pipes 51, the cylinder head 13, and the cylinder head cover 14. It is advisable that the size of the chamber be set by selecting the curvature (e.g., the radius of curvature) of the bend 51C of each of the branched intake pipes 51.

Air Cleaner

The air cleaner 7 which communicates with the surge tank 52 is, as illustrated in FIGS. 1 and 2, disposed just above the slant portions 51D of the branched intake pipes 51. The air cleaner 7 extends over an overall length of the slant portions 51D. The slant portions 51D, as described above, extend obliquely downward to the bends 51C so as to create a space above the bends 51C which is greater in height enough to accommodate the air cleaner 7. The air cleaner 7 has a mount plate 7A formed on an edge thereof close to the surge tank 52. The mount plate 7A is fixed to the surge tank 52 through bolts 20.

The air cleaner 7 is, unlike the prior art structure, disposed without any interference with the gas fuel injection device 11. The size or volume of the air cleaner 7 may, therefore, be increased more than that of the conventional air cleaner.

Gas Fuel Injection Device

The gas fuel injection device 11 is, as illustrated in FIGS. 1, 2, and 4, equipped with a gas fuel delivery pipe 10A, gas fuel injectors 10B, and a gas fuel tank 10C. The gas fuel delivery pipe 10A is, as can be seen in FIG. 4, disposed parallel to a line extending through the upstream ends 51A of the branched intake pipes 51 connecting with the surge tank 52. The gas fuel delivery pipe 10A is joined to the gas fuel tank 10C through a pipe (not shown). The gas fuel tank 10C stores the gas fuel such as compressed natural gas (CNG).

The gas fuel injectors 10B are, as illustrated in FIG. 4, joined to the gas fuel delivery pipe 10A. The gas fuel injectors 10B are arrayed at a given interval D2 away from each other along the length of the gas fuel delivery pipe 10A (i.e., in the lateral direction of the vehicle) in communication with outlets of the gas fuel delivery pipe 10A. The interval D2 between adjacent two of the gas fuel injectors 10B is substantially identical with the interval D1 between the upstream ends 51A of adjacent two of the branched intake pipes 51. The gas fuel injectors 10B and the upstream ends 51A of the branched intake pipes 51 are arranged alternately in a direction in which the branched intake pipes 51 are arrayed (i.e., the lateral direction of the vehicle).

The gas fuel injection device 11 equipped with the gas fuel injectors 10B and the gas fuel delivery pipe 10A is, as can be seen in FIG. 1, disposed in a clearance S2 between the air cleaner 7 and the surge tank 52. Each of the gas fuel injectors 10B is, as clearly illustrated in FIGS. 1 and 4, located near the upstream end 51A of one of the branched intake pipes 51 between adjacent two or on the side of one of the upstream ends 51A (i.e., the slant portions 51D). Such a layout of the slant portions 51D of the branched intake pipes 51 avoids strong direct interference of the gas fuel injectors 10B which are lower in rigidity in the gas fuel injection device 11 with parts of the engine 1 or peripheral devices mounted in the vehicle when an external force acts on the vehicle. Specifically, the engine 1 serves to protect the gas fuel injection device 11 physically.

Each of the gas fuel injectors 10B, as illustrated in FIG. 1, has a top end (i.e., a head) working as an outlet 10D connected to one of the gas fuel hoses 9 and is oriented obliquely relative to the vertical direction, that is, inclined at a given angle to the horizontal direction of the engine body 4 to have the outlet 10D facing the bend 51C of a corresponding one of the branched intake pipe 51. In other words, the outlet 10D of each of the gas fuel injectors 10B has a center line or axis extending through or near the bend 51C of the branched intake pipe 51.

Figure 3:
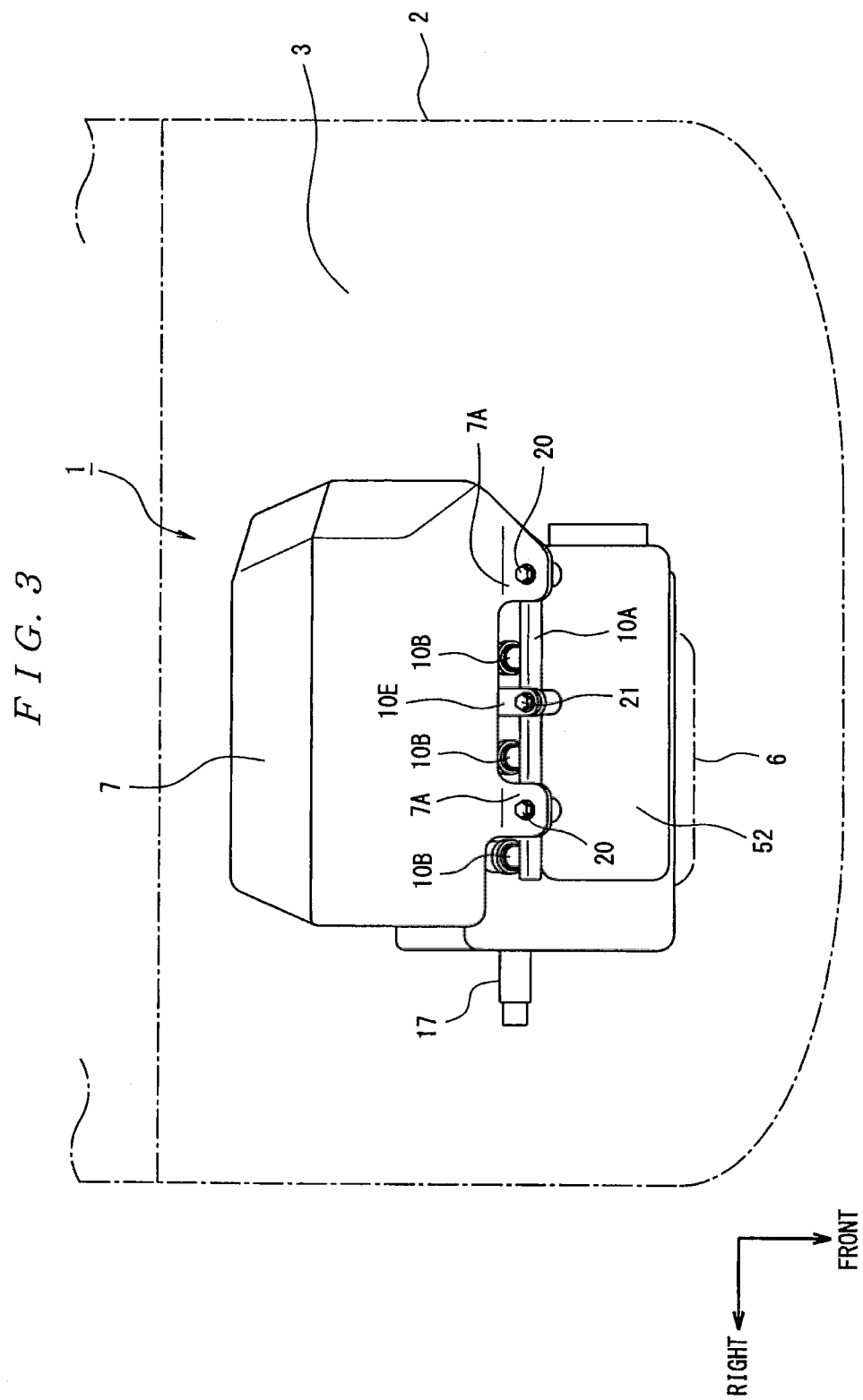
FIG. 3 is a plan view of the bi-fuel engine of FIG. 1.

The gas fuel injection device 11, as illustrated in FIGS. 1 and 3, has a mounting member 10E made of, for example, a bracket. The mounting member 10E is secured to the surge tank 52 using a bolt 21 to retain the gas fuel delivery pipe 10A and the gas fuel injectors 10B together.

Each of the gas fuel hoses 9 is, as illustrated in FIGS. 1, 2, and 4, joined at an end 9A thereof to a portion of a corresponding one of the branched intake pipes 51 near the downstream end 51B and at an end 9B thereof to the outlet 10D of a corresponding one of the gas fuel injectors 10B. The gas fuel hoses 9, as illustrated in FIG. 1, extend along the branched intake pipes 51.

When it is required to run the engine 1 on the gas fuel, the controller of the vehicle, as described above, outputs the control signal to each of the gas fuel injectors 10B of the gas fuel injection device 11 to spray the gas fuel into one of the branched intake pipes 51.

As described above, the engine 1 is so designed that the intake manifold 5 and the air cleaner 7 do not physically interfere with the gas fuel injection device 11, thereby permitting the branched intake pipes 51 of the intake manifold 5 to be increased in length thereof and also facilitating installation of the air cleaner 7 of an increased volume as compared with the conventional structure. It is also possible to increase the volume of the air cleaner 7 in order to decrease the resistance to the suction of air thereinto.

The gas fuel injection device 11 is, as described above, disposed between the surge tank 52 and the air cleaner 7, thus enabling the mounting member 10E of the gas fuel injection device 11 and the mount plate 7A of the air cleaner 7 to be both fixed to the surge tank 52. The surge tank 52 occupies an upper portion of the engine 1, thus improving the ease of installation of the air cleaner 7 and the gas fuel injection device 11.

The location of the gas fuel injection device 11 between the surge tank 52 and the air cleaner 7 also eliminates the need for an assembly worker to dismount the gas fuel injection device 11 (i.e., the gas fuel delivery pipe 10A and the gas fuel injectors 10B) and the gas fuel hoses 9 when the cylinder head cover 14 is removed from the engine body 4. This facilitates the ease with which the cylinder head cover 14 is install in or uninstall from the working space Si between the upper portion of the engine body 4 and the surge tank 52, thus improving the ease of assembly of the engine 1 further.

An increase in overall length of the gas fuel hoses 9, as compared with the conventional structure, is achieved by laying the gas fuel hoses 9 between the gas fuel injectors 10B and the downstream ends 51B of the branched intake pipes 51 along the increased length of the branched intake pipes 51. This facilitates the ease with which the assembly worker bends or curves the gas fuel hoses 9 to couple them with the gas fuel injectors 10B and the downstream ends 51B of the branched intake pipes 51.

The increase in overall length of the gas fuel hoses 9 also facilitates the ease with which the gas fuel hoses 9 are laid out around or installed to the engine body 4 within the narrow engine compartment 3, thus enhancing the ease of assembly of the engine 1 further.

The increase in overall length of the gas fuel hoses 9 permits them to be made from material which is relatively low in flexibility without sacrificing the ease with which the gas fuel hoses 9 are laid out around or installed to the engine body 4, i.e., the assembly workability of the engine 1. This also allows the gas fuel hoses 9 to be formed by material which is higher in durability and rigidity than conventional gas fuel hoses.

Each of the gas fuel injectors 10B is, as described above, laid near the upstream end 51A of one of the branched intake pipes 51 between adjacent two of the upstream ends 51A (i.e., the slant portions 51D) or on the side of one of the upstream ends 51A. Such a layout of the gas fuel injectors 10B in relation to the slant portions 51D of the branched intake pipes 51 avoids strong direct interference of the gas fuel injectors 10B which are lower in rigidity in the gas fuel injection device 11 with parts of the engine 1 or peripheral devices mounted in the vehicle when an external force acts on the vehicle. Specifically, the engine 1 serves to protect the gas fuel injection device 11 physically.

The use of the mount plate 7A in securing the air cleaner 7 to the surge tank 52 through the bolt 20 facilitates the ease with which the air cleaner 7 is installed to or uninstalled from the surge tank 52.

Each of the gas fuel injectors 10B is so inclined at a given angle to the vertical direction as to have the outlet (i.e., the head) 10D which is joined to one of the gas fuel hoses 9 and faces the bend 51C of a corresponding one of the branched intake pipes 51. This enables the assembly worker to visually perceive the outlet 10D of the gas fuel injector 10 from the direction, as indicated by an arrow B in FIG. 1, when the gas fuel hose 9 is coupled to the outlet 10D, thus resulting in an improvement of ease of installation of the gas fuel hose 9 to the engine 1. Additionally, the smooth coupling of the gas fuel hose 9 to the outlet 10D of the gas fuel injector 10B is achieved by moving an upper portion of the gas fuel hose 9 along the upper side of the slant portion 51D of the branched intake pipe 51. This also enhances the ease of installation of the gas fuel hose 9 to the engine 1, i.e., the ease of assembly of the engine 1.

The bracket-like mounting member 10E of the gas fuel injection device 11 which holds the gas fuel delivery pipe 10A and the gas fuel injectors 10B together is, as described above, attached to the surge tank 52 through the bolt 21, thus facilitating the ease of installation of the gas fuel injection device 11 to the surge tank 52.

The inclined orientation of the branched intake pipes 51 (i.e., the slant portions 51D), as described above, develops the space large enough to accommodate the air cleaner 7. The branched intake pipes 51 are arrayed at a given interval away from each other to create gaps which serve to protect the gas fuel injection device 11 (i.e., the gas fuel injectors 10B) physically.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modifications to the shown embodiment which can be embodied without departing from the principle of the invention as set forth in the appended claims.

For instance, the gas fuel hoses 9 are laid along the sides of the branched intake pipes 51, but however may be disposed slightly closer to the engine body 4 than to the sides of the branched intake pipes 51, that is, pass through a space between the branched intake pipes 51 and the engine body 4.

The engine 1 is mounted in the engine compartment 3 with the intake manifold 5 located on a rear side of the engine 1 which faces the rear of the vehicle, but may be disposed in another orientation in the engine compartment 3.

The liquid fuel injection device 8 is disposed in a space between the branched intake pipes 51 and the engine body 4, but may be arranged outside the space.

What is claimed is:

1. A bi-fuel engine for a vehicle comprising:
   an engine body which has a cylinder head cover disposed detachably on an upper portion thereof;
   a plurality of branched intake pipes joined at downstream ends thereof to a side of the engine body in communication with an intake path in the engine body;
   a surge tank to which an upstream end of each of the branched intake pipes is coupled;
   an air cleaner which communicates with the surge tank;
   a liquid fuel injection device which works to inject a liquid fuel into the engine body;
   a plurality of gas fuel hoses each of which is joined at a first end thereof to a portion of one of the branched intake pipes which is located near the downstream end; and
   a gas fuel injection device equipped with a plurality of gas fuel injectors each of which connects with a second end of one of the gas fuel hoses,
   wherein each of the branched intake pipes has a length including a slant portion and a bend, the bend being located laterally to the engine body and having a first end leading to the slant portion and a second end leading to the downstream end of the branched intake pipe, the slant portion extending from the first end of the bend to the upstream end of the branched intake pipe at a given angle to a horizontal direction of the engine body so as to create between the surge tank and the upper portion of the engine body a space which is large enough to permit the cylinder head cover to be installed to and uninstalled from the upper portion of the engine body.

2. A bi-fuel engine as set forth in claim 1, wherein the air cleaner is disposed above the slant portions of the branched intake pipes, wherein the gas fuel injection device is disposed in a clearance between the surge tank and the air cleaner, the gas fuel injectors being located near the upstream ends of the branched intake pipes, wherein the gas fuel hoses extend along the branched intake pipes, respectively, and wherein the liquid fuel injection device is disposed in a space defined between the engine body and the branched intake pipes.

3. A bi-fuel engine as set forth in claim 1, wherein each of the gas fuel injectors is so inclined at a given angle to the horizontal direction of the engine body as to have a head to which one of the gas fuel hoses is joined and which faces the bend of one of the branched intake pipes.

4. A bi-fuel engine as set forth in claim 1, wherein the gas fuel injectors and the gas fuel hoses are disposed alternately in a direction in which the branched intake pipes are arrayed.

5. A bi-fuel engine as set forth in claim 1, wherein the gas fuel injection device and the air cleaner are secured to the surge tank.

6. A bi-fuel engine as set forth in claim 1, wherein the engine body is so designed as to be mounted in a vehicle with the branched intake pipes facing a rear of the vehicle.

* * * * *